Patented May 3, 1949

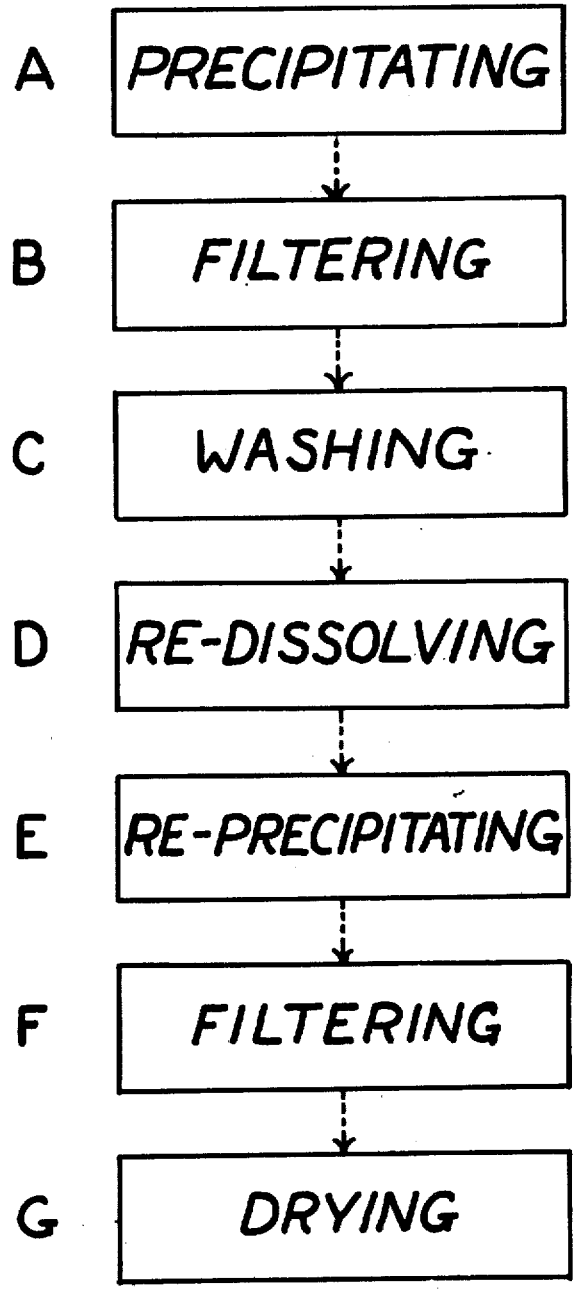

2,468,730

UNITED STATES PATENT OFFICE 2,468,730

METHOD OF PURIFYING CASEIN

Richard J. Block, Scarsdale, and Hartley W. Howard, Irvington, N. Y., assignors to The Borden Company, New York, N. Y., a corporation of New Jersey Application October 19, 1945, Serial No. 623,250

6 Claims. (Cl. 260—120)

This invention relates in general to improvements in processes for the manufacture of proteins, in particular casein, and to the products resulting therefrom.

Many processes have been proposed heretofore for the manufacture of proteins such as casein. These processes have included methods involving temperature control, variations in the reagents employed and different methods and processes for the recovery of the final product. None of these prior processes, however, has included a simple but efficient method for the production of an edible casein which is so purified as to be substantially ashless, vitamin-free, and bland in taste.

It was, therefore, a general object of the present invention to devise an improved process for the manufacture of a protein such as casein.

It was a particular object of the invention to provide a process whereby there could be produced a casein which would have a high degree of purity.

Another object was to provide a process for the commercial manufacture of casein which would overcome the disadvantages heretofore encountered in the prior art.

A still further object of the invention was to produce a casein composition substantially ashless, vitamin-free and bland in taste.

Further objects of the invention will in part be obvious and will in part appear from the following description, in which the preferred embodiments of the invention have been set forth in detail.

In the attached drawing there is shown by way of illustration a flow sheet giving various steps A to G which may be followed in carrying out a now preferred process of the invention.

In general, the steps of this process comprise:

A—Precipitating the protein;
B—Separating the precipitate from the supernatant liquor;
C—Washing the precipitate;
D—Redissolving the precipitate;
E—Thereafter reprecipitating the dissolved precipitate;
F—Filtering the reprecipitated material and, preferably,
G—Drying the purified product.

The invention accordingly comprises the several steps and the relation of one or more of such steps with respect to each of the others, and the product and article possessing the features, properties, and the relation of elements, which are exemplified in the following detailed disclosure, and the scope of the invention will be indicated in the claims.

As the starting material there may be employed any convenient source of casein such as fresh skimmed cow's milk, but it is to be understood that other sources of casein may be used, such, for example, as that obtained from other types of milk; also impure dried casein which is found in commercial markets, such as the casein imported from the Argentine.

Among the acid reagents which may be used for precipitating the casein there may be employed various acids or acid gases such as inorganic acids; for example, sulfurous acid, sulfuric acid, hypochlorous acid, hydrochloric acid, and the like. Among the organic acids which may be used as precipitating agents there may be employed lactic acid, chloracetic acid, formic acid, and the like. Among the acid gases which may be used as such precipitants there may be employed the gas of a mineral acid, such, for example, as sulfur dioxide, sulfur trioxide, hydrogen chloride, and the like.

While the invention has been illustrated with reference to batch process methods, it is to be understood that in the commercial operation of the process a continuous process may be employed.

In a now preferred embodiment for carrying out the process of the invention, fresh skimmed milk is warmed in an open vessel to 95°–100° F. An acid such as purified sulfur dioxide gas is then introduced as a fine stream, while agitating the milk, until the curds comprising the casein are completely formed. It has been found that at temperatures of 95°–100° F. a better uniformity of granules are obtained during precipitation which in turn results in better filtration. However, skimmed milk can be treated with an acid gas at room temperature or below, such as temperatures as low as 45° F., and still yield a fairly good product. The pH of the milk at this stage will lie between 4.0 and 6.0 It is preferred, however, that the amount of acid gas introduced is such as to produce in the milk a pH of 4.5–4.6, the isoelectric point of casein, as at this pH there is obtained the best yields of casein, i. e., the maximum elution of casein with a minimum occlusion of the vitamins and other foreign substances present (step A).

After the casein is precipitated, the gas is shut off and stirring continued for a short time, after which the pH of the mass is redetermined. If it is found that it has varied from the optimum pH 4.5–4.6, sufficient acid or alkali is added to readjust the pH to this value, stirring being continued during addition of the gas. The whey is then separated from the curd precipitate which contains the casein by any convenient method, such as filtering, centrifuging, or decanting (step B). It is unnecessary to reheat the material prior to or during filtration. The whey which is separated from the precipitate is preferably preserved for further processing, which may involve preparation of by-products such as lactalbumin, milk sugars, and the like.

The precipitate thus obtained is transferred to a separate vessel wherein it is suspended in an excess volume of wash water and thoroughly agitated (step C). If necessary the pH of the suspension is again adjusted to 4.5–4.6, adding acid, acid gas or ammonium hydroxide as required. After washing in this manner the precipitate is again filtered or otherwise separated from the wash water.

The washings may be repeated if desired; but in the final washing, an excess volume of acid gas is added with vigorous agitation until the pH this time is lowered from 4.5–4.6 to pH 1.8–1.9. At these lowered acid pH values the precipitate comprising the casein tends to redissolve in the water as a colloidal mass. The colloidal mass is stirred continuously under these conditions until the mixture appears uniform (step D). It has been found that at such lowered pH values the vitamin content of the casein is destroyed, and other impurities are removed such that the final product is rendered substantially ash-free. It is thought that since the particles of casein become somewhat colloidal or jelly-like in character at such pH values, this permits water and acid to pass therethrough, resulting in the formation of a purified product.

After the mixture has been sufficiently agitated under these conditions, the colloidal mass of casein is next reprecipitated by adding sufficient alkali such as ammonium hydroxide until the pH is again adjusted to between 4.0 and 6.0, preferably at the isoelectric point within this pH range, i. e., a pH of 4.5–4.6 (step E). Stirring is continued and the pH again tested. If necessary, further acid or alkali is added to adjust the pH to the optimum value of 4.5–4.6, after which the precipitate is separated from the liquor as by filtering, preferably at room temperature (step F). The casein thus recovered is remarkably pure as compared with other casein products on the market. The moist casein may be thereafter dried, as desired (step G).

For purposes of illustration but not by way of limiting the invention, the following examples are given. All parts are by weight unless otherwise specified.

Example I

Twenty quarts of skimmed milk were heated to 39° C. and $SO_2$ gas was then passed in with stirring until the pH reached 4.5–4.6. The clear yellow whey was removed by decanting and the curd was washed with five liters of water at room temperature. The curd was then suspended in 9.5 liters of tap water at room temperature and $SO_2$ gas was passed in with stirring until the pH of the solution reached 1.8–1.9. The solution was stirred at this pH for 20 minutes, more gas being added if necessary to readjust the pH. Ammonium hydroxide was then added with stirring to adjust the pH to 4.7. Approximately 140 cc. of ammonium hydroxide were needed. The suspension of the casein was stirred for 10 minutes maintaining the mass at pH 4.7 using $SO_2$ gas or ammonium hydroxide, whichever necessary, to keep the pH substantially at 4.7. The purified casein was filtered and washed with five liters of ion-free water adjusted to pH 4.7. The casein cake was again washed with water and the thus purified casein was then dried in a vacuum oven at about 40 to 55° C.

Example II 300 cc. of crude, dried Argentine casein were suspended in 10 liters of water heated to 60° C. and sufficient concentrated ammonium hydroxide was added with stirring to bring the pH to 6.9. The stirring was continued for 10 minutes and further concentrated ammonium hydroxide added if necessary to keep the pH at 6.9. At this point the crude casein dissolved, and was filtered to remove possible dirt and other impurities. The casein solution was cooled to 40° C. and gaseous $SO_2$ was then passed therein while rapidly stirring to adjust the pH to 4.5–4.6. The rest of the procedure followed that of Example I, beginning with the second sentence, except that the casein was suspended and washed in 10 liters of water instead of 9.5 liters, before adjusting the pH to 1.8–1.9 with $SO_2$ gas.

Example III 100 pounds of fresh skimmed cow's milk were slowly heated to about 100° F. in a suitable vessel, preferably glass or one lined with stainless steel. The vessel was equipped with an agitator. A fine stream of gaseous sulfur dioxide was introduced into the heated milk during agitation until the milk attained a pH of 4.5–4.6. Agitation was continued for 5 minutes after the addition of the gas was discontinued. The pH was then redetermined. If necessary, additional sulfur dioxide was added while stirring to readjust the pH to 4.5–4.6.

After the milk had attained a constant pH value, the curds were separated from the whey. This was done by filtering the mass through a double thickness of cheesecloth. The crude casein material thus recovered was then suspended in 50 pounds of water in a glass-lined vessel and vigorously agitated for several minutes. The pH of the suspension was again determined and, if necessary, adjusted to 4.5–4.6 by adding gaseous sulfur dioxide or aqueous 14% ammonium hydroxide as required.

After the washing operation the material was again filtered through cheesecloth, washed on the filter with about 50 pounds of water, and both the filtrate and the wash liquor discarded. The casein material was again suspended in a vessel containing 50 pounds of water and agitated as in the previous operation. This time, however, gaseous sulfur dioxide was introduced until the pH was adjusted to 1.8–1.9. At this point the casein became somewhat gelatinous in nature and the mixture had a colloidal appearance. Stirring was continued until the mixture appeared entirely uniform. The time required to perform this operation, using these proportions, was approximately 30 minutes. After the material had attained a uniform appearance, and while continuing agitation, 14% aqueous ammonium hydroxide was then added until the pH of the mass was 4.5–4.6. Stirring was continued thereafter for 10 minutes, whereupon the pH was redetermined. If necessary, additional sulfur dioxide gas or ammonium hydroxide was added to adjust the pH to 4.5–4.6 and the mass again agitated for 5 to 10 minutes. The pH of the mixture was again tested and, if the pH did not remain substantially constant, further alkali or acid gas was added until the pH remained constant at 4.5–4.6 for at least 5 minutes after agitation. The mixture was then filtered and the filtrate discarded. After filtering the precipitate was washed again, suspended in 50 pounds of water, vigorously agitated, and the pH again adjusted to 4.5–4.6 if necessary, filtered, and the filtrate discarded. The precipitate was then washed on the filter cloth with about 50 pounds of ion-free water.

At this point, the precipitate may be dried. Alternatively, the precipitate may be homogenized if desired, and thereafter dried on heated rollers. Other means of drying may be employed such as oven drying, tunnel drying, or spray drying.

If it is desired to obtain a dry soluble product the pH of the casein in adjusted just before the final drying step to pH 6.0–7.0 by adding sufficient ammonium hydroxide.

Alternatively, sodium carbonate, sodium hydroxide, quaternary ammonium compounds, amines and the like may be employed, wherever ammonium hydroxide is specifically mentioned, and in any of the various steps requiring use of an alkali or basic substance.

In place of precipitating the casein at approximately pH 4.5 or its isoelectric point initially, the pH may be immediately lowered to about pH 1.8–1.9, filtered to remove impurities which may be present, the casein then precipitated at pH 4.5–4.6 by adding sufficient alkali; and if necessary redissolved and reprecipitated as many times as deemed desirable to attain a purified product.

Over 95% yield of the original casein in the fresh skimmed milk is obtained by the process of this invention as a vitamin-free, ash-free composition. There is practically no taste or odor to the casein and it is a white, palatable product. It might be pointed out that the use of a gaseous bleaching agent comprising $SO_2$ is preferred over other acid substances as a precipitant in the foregoing process for the reason that it has a peptizing effect on certain solids such as calcium phosphates present in the milk, while at the same time acts as an antiseptic and thus retards bacterial growth during the steps required to carry out the process. Moreover, such bleaching agent provides for a whiter casein product. It is preferred to use sulfur dioxide gas in the present process because, in contrast to most bleaching agents, sulfur dioxide does not destroy or react with the tryptophane but does react with to destroy or remove entirely or in part certain vitamins which may be present and which are objectionable, such for example as vitamin A; also riboflavin and thiamin. Sulfur dioxide gas, moreover, is sufficiently strong to enable one to obtain pH values as low as 1.8, which is often preferred in forming the colloidal material for carrying out the process of the invention.

Instead of employing fresh skimmed milk as a starting material, there may be employed an impure casein such as that obtainable from the Argentine, which is very impure by present standards and is therefore inedible. Such crude caseins may have initial pH values of about 4.8–4.9. In preparing such material for treatment by the methods described hereinabove, such crude casein is first dispersed in water to form an emulsion and the pH is adjusted to approximately 6.8, i. e., to a pH approximating that of fresh milk, thus dissolving the casein, and the material then filtered or centrifuged to remove dirt or other foreign materials. Aqueous ammonium hydroxide may be employed to adjust the pH to 6.8. After the foreign materials and dirt have thus been removed, the process follows that above, namely, gaseous sulfur dioxide is passed into the liquid until attaining a preferred pH of 4.5–4.6, whereupon the casein is precipitated. The treatment of the crude casein then follows that recited above, namely, washing, redissolving and reprecipitating followed by drying.

Various uses have been already found for the purified casein formed as a result of this invention; for example, in pharmaceuticals and as an edible food substance for human consumption especially persons suffering from whole meat allergies; diabetics and infants. The purified casein thus produced is also very useful as a laboratory reagent for experimental use, as it is vitamin-free. It has also been found to be of value for control purposes on laboratory animals.

While we have illustrated our invention with respect to casein, it will be apparent that the process may be adapted to the purification of other proteins such, for example, as soybean globulins, cottonseed globulins, denatured lactalbumins, edestin, and the like.

It is to be understood that the appended claims are to be accorded a range of equivalents consistent with the foregoing disclosure and the prior art.

Having described our invention, what is claimed as new and desired to be secured by Letters Patent is:

1. In a process for preparing purified casein, the steps comprising adjusting an aqueous solution of casein which has a pH above 6 to a pH between 4.0 and 6.0 and thereby precipitating casein, separating the precipitate from the filtrate, suspending the precipitate in an aqueous medium, then adding sufficient sulfur dioxide gas thereto so as to adjust the pH to about 1.9 and thereby form a colloidal sol of the casein, and finally re-precipitating said casein by adjusting the pH to between 4.0 to 6.0, thus producing a purified product.

2. In a process for preparing purified casein, the steps comprising adjusting an aqueous solution of casein which has a pH above 6 to a pH between 4.0 and 6.0 and thereby precipitating casein, separating the precipitate from the filtrate, suspending the precipitate in an aqueous medium, then adding sufficient sulfur dioxide gas thereto so as to adjust the pH to about 1.9 and thereby form a colloidal sol of the casein, maintaining said casein as a colloidal sol for about 30 minutes, and finally re-precipitating said casein by adjusting the pH to between 4.0 to 6.0, thus producing a purified product.

3. In a process for preparing purified casein, the steps comprising adjusting an aqueous solution of casein which has a pH above 6 to a pH of about 4.5 to 4.6 and thereby precipitating casein, separating the precipitate from the filtrate, suspending the precipitate in an aqueous medium, then adding sufficient sulfur dioxide gas thereto so as to adjust the pH to about 1.9 and thereby form a colloidal sol of the casein, and finally re-precipitating the casein by adding ammonium hydroxide until the pH is adjusted to about 4.5 to 4.6, thus producing a purified product.

4. In a process for preparing casein, the steps comprising adding sufficient sulfur dioxide gas to freshly skimmed milk which has been heated to about 100° F. to precipitate the casein at about pH 4.5–4.6, separating the precipitated mass from the filtrate, suspending the precipitate in aqueous media, adding sulfur dioxide gas thereto until the pH is about 1.8–1.9, thereby forming of the casein a colloidal sol, thereafter reprecipitating the casein with ammonium hydroxide at about 4.5–4.6 and collecting the precipitate.

5. In a process for obtaining purified casein, from milk, the steps comprising warming 100 pounds of freshly skimmed milk to 95°–100° F. while passing sulfur dioxide gas therethrough with agitation until the pH is about 4.5–4.6 and until the pH remains constant for about five minutes, separating the precipitate from the filtrate, agitating the precipitate in about 50 pounds of fresh water while readjusting the pH to about 4.5–4.6, adding sulfur dioxide gas thereto until the pH is about 1.8–1.9 and until the pH remains constant for about 30 minutes, thereby forming of the casein a colloidal sol, thereafter adding sufficient ammonium hydroxide to readjust the pH to about 4.5–4.6 and until the pH remains constant for about five minutes, thereafter collecting the purified casein precipitate.

6. In a process for preparing purified casein, the steps comprising dissolving crude commercial casein in aqueous media at about pH 6.8, separating the undissolved impurities therefrom, precipitating the casein by adding thereto sufficient sulfur dioxide gas to adjust the pH to about 4.5–4.6, separating the precipitate from the filtrate, suspending the precipitate in aqueous media, adding sulfur dioxide gas thereto until the pH is about 1.8–1.9, thereby forming of the casein a colloidal sol, thereafter reprecipitating the casein with ammonium hydroxide at about pH 4.5–4.6 and collecting the purified casein precipitate.

RICHARD J. BLOCK.
HARTLEY W. HOWARD.

REFERENCES CITED

The following references are of record in the file of this patent:

UNITED STATES PATENTS

| Number | Name | Date |
|---|---|---|
| 905,943 | Soncini | Dec. 8, 1908 |
| 911,269 | Reuter | Feb. 2, 1909 |
| 2,190,136 | Oberg | Feb. 3, 1940 |
| 2,228,151 | Oberg | Jan. 7, 1941 |

OTHER REFERENCES

"Casein and its Industrial Application," Sutermeister and Browne. Reinhold Pub. Co., N. Y. (1939), pages 28 and 29.